Jan. 10, 1950     F. A. HILL     2,493,873
EXPLOSION GAS TURBINE PLANT
Filed April 25, 1945     2 Sheets-Sheet 1
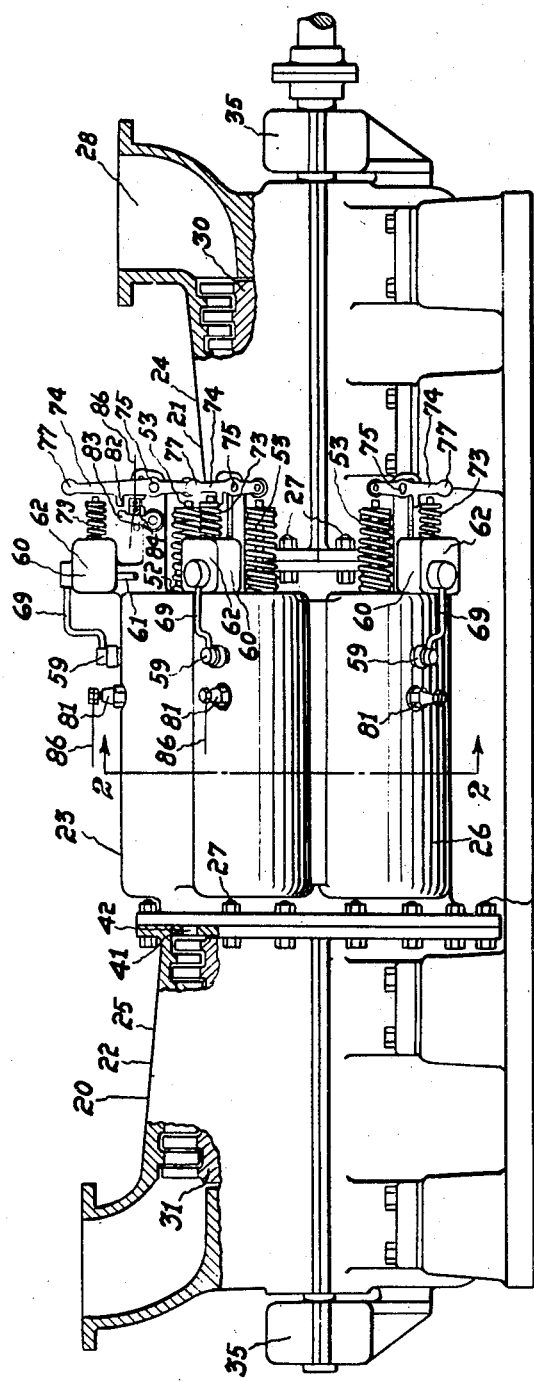
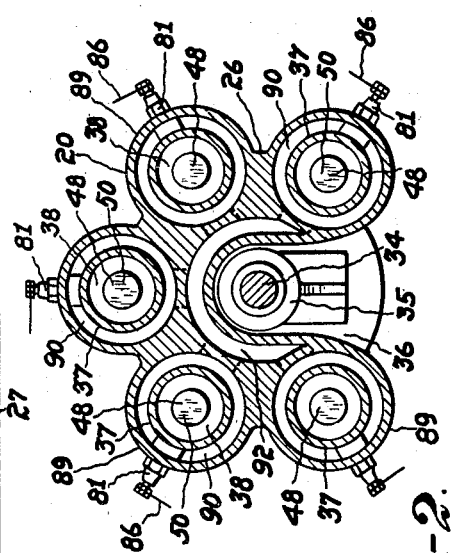
INVENTOR
Frank A. Hill.
BY
HIS ATTORNEY.

Jan. 10, 1950     F. A. HILL     2,493,873
EXPLOSION GAS TURBINE PLANT

Filed April 25, 1945     2 Sheets-Sheet 2

INVENTOR
Frank A. Hill.
BY
HIS ATTORNEY.

Patented Jan. 10, 1950

2,493,873

UNITED STATES PATENT OFFICE 2,493,873

EXPLOSION GAS TURBINE PLANT

Frank A. Hill, Easton, Pa., assignor to Ingersoll-Rand Company, New York, N. Y., a corporation of New Jersey Application April 25, 1945, Serial No. 590,249

2 Claims. (Cl. 60—41)

This invention relates to turbines, and more particularly to an explosion gas turbine plant wherein the gases driving it are applied to the turbine in the form of intermittent puffs.

One object of the invention is the provision of a gas turbine plant of simplified construction requiring only a minimum number of parts for generating the gases.

Another object is to assure a maximum pressure of and heat content in the gases utilized for driving the turbine.

A further object is to utilize a portion of the pressure wave of one explosion occurring within an explosion chamber as a force for compressing the next succeeding charge of explosive mixture introduced into the same chamber.

Another object is to construct a compact and rugged explosion gas turbine plant including a compressor, the entire output of which is utilized for super-charging the gas generator of the plant.

Further objects will be in part obvious and in part pointed out hereinafter.

Figure 3:
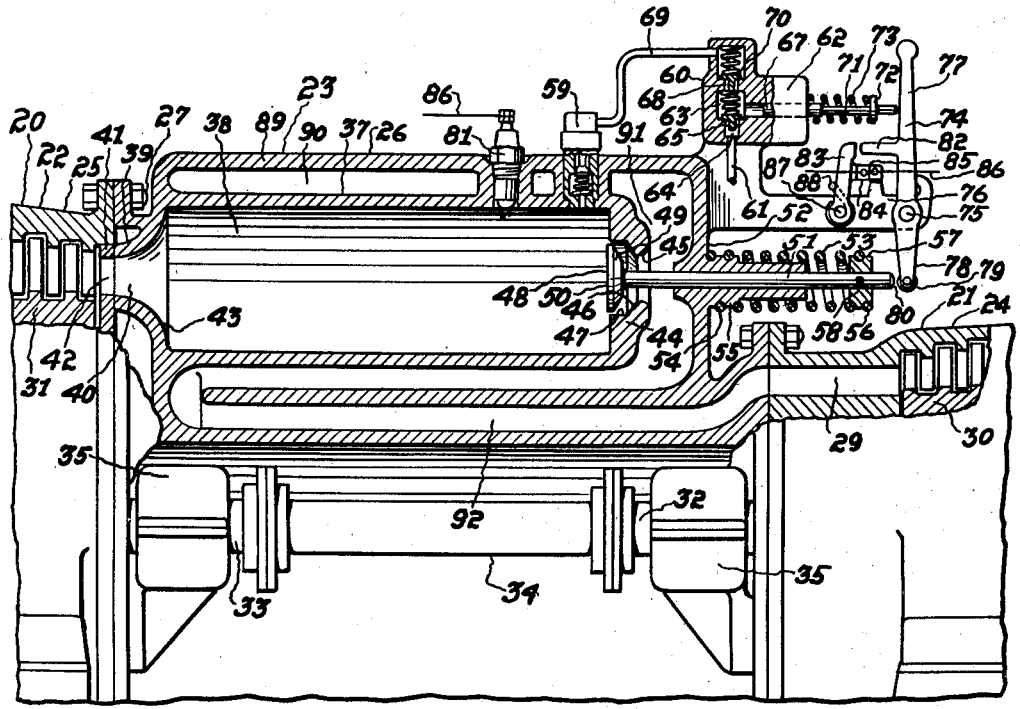
Figure 4:
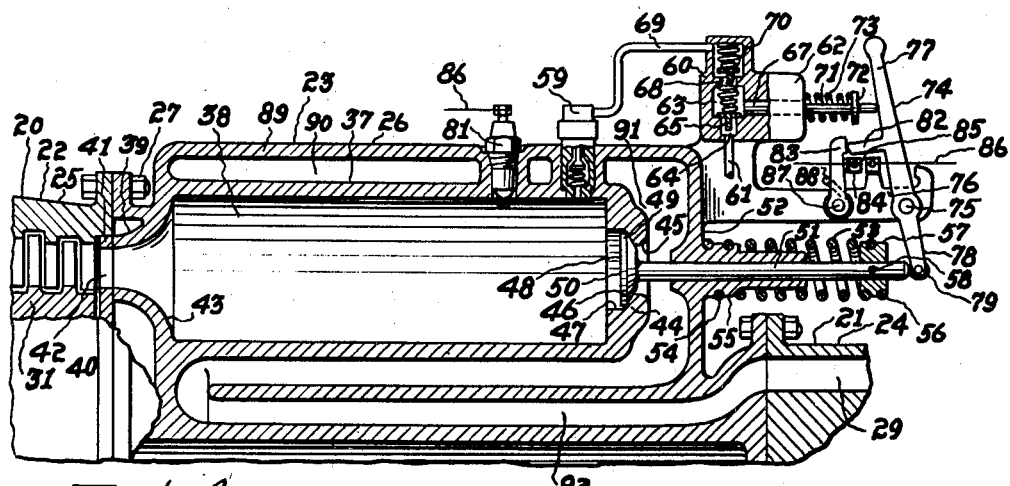

In the drawings accompanying this specification and in which similar reference numerals refer to similar parts, Figure 1 is a longitudinal elevation, partly broken away, of an explosion gas turbine plant constructed in accordance with the practice of the invention, Figure 2 is a transverse view taken through Figure 1 on the line 2—2, Figure 3 is a view similar to Figure 1, somewhat enlarged, showing the positions that the devices controlling the constituents of a fuel charge and its ignition will occupy when at rest, and Figure 4 is a view similar to Figure 3 showing the same devices in the positions they will occupy at the instant of ignition of a fuel charge.

Referring more particularly to the drawings, the explosion gas turbine plant, designated in general by 20, comprises a compressor 21, a turbine 22 for driving the compressor and a gas generator 23 between the compressor and the turbine to supply the gases serving to drive the turbine.

The compressor and the turbine are shown as being of the axial flow types and have, respectively, casings 24 and 25 that are secured at their opposed ends to the adjacent ends of the casing 26 of the generator by bolts 27. The casing 24 has the usual inlet opening 28 at one end for the admission of air thereinto and at its opposite end a passage 29 of partly annular shape through which the compressed air is discharged from the compressor.

The rotors 30 and 31 in the casings 24 and 25, respectively, are arranged coaxially with each other, and the opposed ends of their shafts 32 and 33 are connected by a coupling member 34. The casings are provided with outboard bearings 35 for the shafts, and the shaft of the compressor is shown extended beyond its outermost bearing 35 to serve as a power take-off.

In the form illustrated, the casing 26 is of arcuate shape. It has an opening 36 in the underside thereof to admit of access to the coupling member 34 and the adjacent bearings and on its periphery, and extending longitudinally thereof, are a plurality of cylinders 37 the interiors of which constitute explosion chambers 38 for the propagation of gases serving to drive the rotative elements of the plant. The walls of the end portions 39 of the cylinders 37 adjacent the turbine 22 are constricted to define exhaust nozzles 40 and abut a ring 41, in the end of the turbine casing 25, having ports 42 through which the gases flow from the nozzles to the turbine.

The nozzles are of a flow area well suited to assure a high velocity of the gases issuing from the explosion chambers. They flare outwardly at their inner ends to the walls of the cylinders 37, and the inner surfaces of the flared portions of the nozzles constitute annular reflecting surfaces 43 that serve to reflect the pressure waves of the explosions taking place in the chambers 38.

The cylinders 37 have heads 44 at their opposite ends, and each head 44 has a port 45 to admit combustion-supporting air, in the present instance the air discharged from the compressor 21, into the explosion chamber. The port 45 is of wide flow area, and at its inner end is a beveled seating surface 46 that joins at its end of maximum diameter with a cylindrical passage 47 opening into the end of the explosion chamber 38.

The flow of compressed air through the port 45 is controlled by a reciprocatory valve 48 in the form of a plate having a beveled surface 49 for sealing engagement with the surface 46. The opposite end of the valve constitutes a pressure surface 50 that confronts the explosion chamber and is constantly subjected to the pressure within the chamber 38, and on the valve is a stem 51 that extends axially through the port 45 and slidably through an end wall 52 of the casing 26 overlying the head 44.

The valve has a loose running fit in the passage 47 and, when at rest, stands away from the seating surface 46, preferably in such a position that it lies partly within the explosion chamber 38 and requires only a slight degree of movement to establish full communication between the recess 47 and the chamber 38. It is held thus by a spring 53 anchored at an end 54 to a stationary part, as by threadedly connecting it to a boss 55 on the wall 52, and the opposite end 56 of the spring is connected, in like manner, to a collar 57 near the outer end of the valve stem 51 and secured in position by a pin 58 extending through the two. The mass of the valve and the scale of the spring are so selected as to render the valve completely responsive to the pressure waves within the chamber 38 and the valve will, therefore, reciprocate at the frequency of such pressure waves.

In addition to their normal function, the valves also serve to effect the introduction of liquid fuel into the chambers 38 and the ignition of the explosive mixture. Each valve performs these services exclusively for the chamber 38 wherewith it is associated, and its cycle of operation and of the devices it actuates is, therefore, uninfluenced by the pressure conditions in other explosion chambers of a group. Each explosion chamber is accordingly provided with a fuel spray nozzle 59, of a well known type, arranged in the wall of the cylinder 37, preferably near the head 44 and positioned to direct a spray of fuel transversely through the explosion chamber.

The fuel is supplied to the spray nozzle 59 by a fuel pump 60 which itself may receive the fuel under pressure from a suitable source of supply (not shown) through a conduit 61. The fuel pump 60 may, as indicated, be supported by the casing 26 and comprises a body 62 having a pumping chamber 63 into which the liquid fuel flows from the conduit 61 through a passage 64, communication between the passage 64 and the pumping chamber 63 being controlled by a spring-pressed check valve 65. The fuel is ejected from the pumping chamber 63 by a plunger 67 and passes through an outlet passage 68 into a conduit 69 leading to the spray nozzle 59. A spring-pressed check valve 70 in the passage 68 normally prevents the flow of fuel to the spray nozzle.

On the plunger 67 is a stem 71 that projects exteriorly of the body 62 and carries a collar 72 to serve as a seat for an end of a spring 73 the opposite end of which bears against the body 62 to retract the plunger on its suction stroke. Movement of the plunger for the pumping stroke is effected by the valve 48 through a rocker 74 pivotally connected, by a pin 75, to an arm 76 on the casing 26. One end portion 77 of the rocker overlies and engages the end of the stem 71 and the opposite end 78 of the rocker overlies the end of the valve stem 51 and carries a roller 79 against which the valve stem strikes for tilting the rocker 74 about its pivot. The roller 79 is so positioned that a slight clearance 80 exists between it and the end of the valve stem 51 in the neutral position of the valve 48.

Owing to this arrangement of the parts, whenever the valve 48 moves toward the seating surface 46 the valve stem 51 will strike against the roller 79 and tilt the rocker 74 about its pivot 75. This movement of the rocker, transmitted through the arm 77 to the plunger 67, will drive the plunger on its pumping stroke and cause fuel to be ejected from the spray nozzle 59 into the explosion chamber.

Preferably, the arm 77 of the rocker 74 is of greater length than required for engagement with the plunger stem 71 to assure ample leverage for manually thrusting the plunger 67 on its pumping stroke, as may be required at the beginning of an operating period.

The explosive mixture is ignited by a spark plug 81 arranged in the wall of the cylinder 37 adjacent the spray nozzle 59, and the forming of the electric sparks is also controlled by the valve 48 and effected through the action of the rocker 74. The rocker accordingly has a laterally extending stem 82 intermediate the ends of the arm 77 to trip a lever 83 carrying the movable contact 84 of an interruptor 85 arranged in an electrical circuit 86 connected to the spark plug 81.

The interruptor 85 may, as shown, be arranged upon the arm 76, the stationary contact being fixedly secured to the arm, and the lever 83 is pivoted to the arm by a pin 87 extending through an end of the lever. A spring 88 serves, in a well known manner, to hold the lever in position to maintain the contacts of the interruptor in engagement with each other, and the free end of the lever lies in the plane of movement of the stem 82 and is so spaced with respect thereto that the stem will engage and tilt it for breaking the ignition circuit only after the rocker has swung a sufficient distance to thrust the plunger 67 through a portion of its pumping stroke.

The entire output of the compressor 21 is delivered to the explosion chambers for supercharging them and is preferably conveyed over the outer surfaces of the cylinders 37 to insulate said cylinders and return the heat radiating therefrom back to the explosion chambers 38. To this end, each cylinder 37 is encircled by a jacket 89 the interior of which forms a passage or chamber 90 through which the compressed air passes over the cylinders to the space 91 between the head 44 and the wall 52. The compressed air enters the chambers 90 adjacent the nozzles 40 and is conveyed thereto by an arcuately shaped passage 92, in the casing 26, communicating with the discharge passage 29 of the compressor.

In practice, and at the beginning of an operating period of the plant, one of the pump plungers 67 is driven on its working stroke by pressure applied manually against the rocker 74. In this way fuel will be ejected from the associated spray nozzle 59 into the explosion chamber, and near the end of the injection stroke of the plunger 67 the rocker 74 will tilt the lever 83 and open the electrical circuit 86, thereby effecting the ignition of the explosive mixture in the chamber 38.

The resulting pressure rise, acting against the pressure surface 50, will then immediately move the valve 48 against the seating surface 46 and close the port 45. At the same time, the explosion pressure wave travels down the explosion chamber and is expanded through the nozzle 40 at high velocity, and consequently greatly reduced temperature, into the turbine for driving the rotative parts of the plant.

When the pressure wave reaches the nozzle and part of the pressure is expanded therethrough, a pressure of lower value than that existing in the spaces 91 will be created in the explosion end of the chamber 38. The valve 48, being attuned to operate at the frequency of the pressure waves in the explosion chamber will then move to its open position and admit a new charge of air through the port 45 into the explosion chamber 38. At the same time a part of the pressure wave will be reflected, by the reflecting surface 43, back to its zone of origin and will compress the newly admitted charge of air and again move the valve 48 against its seating surface 46.

During this closing movement, the valve will tilt the rocker 74 and cause the plunger 67 to inject fuel into the explosion chamber 38 and to rock the lever 83 for effecting the ignition of the explosive mixture. Thereafter, the cycle of operation, as above described, will be repeated without further manual action, and the gases thus generated by the regularly spaced explosions are expanded as intermittent puffs through the nozzles into the turbine for driving it.

The remaining explosion chambers are set in operation in like manner, that is to say, the initial charge of fuel is sprayed into the explosion chambers by pressure applied manually to the rockers 74 for actuating the pump plungers 67 and to cause ignition of the explosive mixtures until all of the explosion chambers 38 are in operation.

From the foregoing description it will be apparent to those skilled in the art that the frequency of the explosion pressure waves within an explosion chamber, and consequently the movements of the valve, will depend upon such factors as the length of the explosion cylinder, and the flow area of the nozzle 40 with respect to the cross-sectional area of the explosion chamber, as well as the type of fuel used for gas propagation and the proportion of fuel to air in the explosive mixture.

It will, moreover, be apparent from the foregoing description that changes and modifications may be made without departing from the spirit of the invention or the scope of the claims. Thus, for example the explosive mixture may be formed by carburetion instead of spraying the fuel into explosion chambers as described herein, the fuel injecting and igniting devices may be actuated otherwise than by the valve, it being essential only that they be caused to act in correctly timed relation with the charging of the explosion chamber, and the valve, itself, may be actuated by pressure acting on opposed surfaces thereof instead of being spring-suspended, as shown, to move at the frequency of the explosion pressure waves in the explosion chamber.

I claim:

1. An explosion turbine plant, comprising a turbine, a casing having an explosion chamber for supplying explosion gas to the turbine, a fuel-metering device for the explosion chamber, an igniting device for igniting the fuel in the chamber, said casing having a port at the explosion end of the chamber for admitting combustion-supporting air into the said chamber, a reciprocatory valve to control the port, and spring means to oppose endwise movement of the valve in either direction and acting to hold the valve normally in an unseated position.

2. An explosion turbine plant, comprising a turbine, a casing having an explosion chamber for supplying explosion gas to the turbine, a fuel-metering device for the explosion chamber, an ignition device for igniting the fuel in the chamber, a reflecting surface on the casing for reflecting pressure waves caused by explosions in the chamber, said casing having a port at the explosion end of the chamber for admitting combustion-supporting air into the said chamber, a reciprocatory valve to control the port and actuated into the closed position by reflected pressure waves, and spring means to oppose endwise movement of the valve in either direction and acting to hold the valve normally in an unseated position.

FRANK A. HILL.

REFERENCES CITED

The following references are of record in the file of this patent:

UNITED STATES PATENTS

| Number | Name | Date |
|---|---|---|
| 1,052,588 | Janicki | Feb. 11, 1913 |
| 2,379,212 | Birge | June 26, 1945 |

FOREIGN PATENTS

| Number | Country | Date |
|---|---|---|
| 277,090 | Great Britain | Sept. 8, 1927 |
| 640,228 | Germany | Dec. 28, 1936 |